INVENTORS.
SIMON TALMASKY
GEORGES DUVAL
JACQUES BAUDIN
BY Paul M. Craig, Jr.
ATTORNEYS.

INVENTORS.
SIMON TALMASKY
GEORGES DUVAL
JACQUES BAUDIN
BY Paul M. Craig, Jr.
ATTORNEYS.

3,146,405

SAFETY AND CONTROL ARRANGEMENT FOR PLACING A PLURALITY OF OSCILLATORS IN PARALLEL

Simon Talmasky, Paris, Georges Duval, Boulogne, and Jacques Baudin, Paris, France, assignors to Compagnie Industrielle des Telephones, Paris, France Filed Mar. 24, 1961, Ser. No. 98,114
Claims priority, application France Apr. 27, 1960
8 Claims. (Cl. 331—49)

Figure 1:
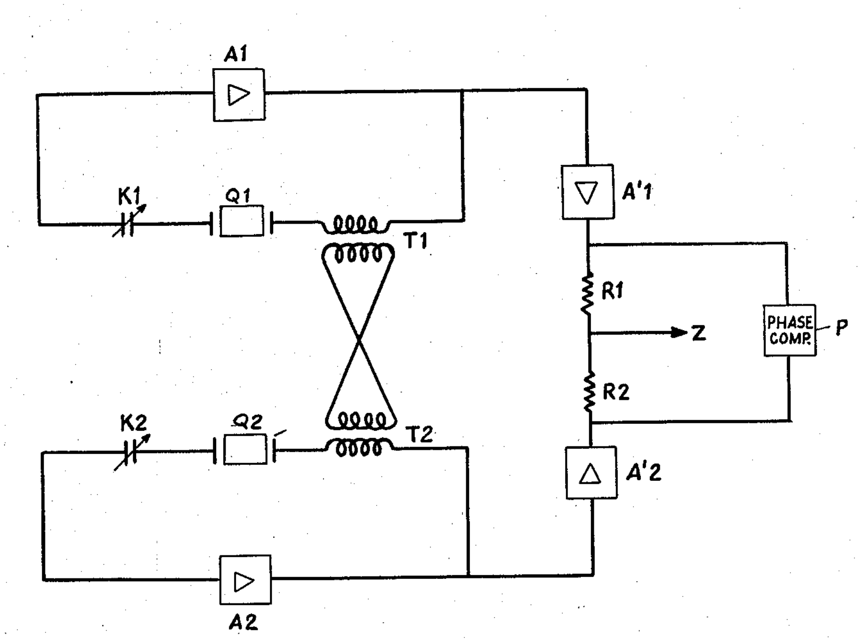

The present invention relates, in general, to installations comprising two electrical oscillators connected in parallel, and more particularly to oscillators utilized to produce carrier frequencies in telecommunication installations provided with multiple paths.

It is indispensable in such installations, for the regularity of the traffic, that the operation of these oscillators be assured with a very high degree of security and safety.

Different means to resolve this problem have been proposed heretofore in the prior art, namely:

(1) In one prior art system, there are used two independent oscillators, with one oscillator in service and another oscillator in reserve, and a commutation device, generally of the relay type, which permits to connect with the utilization or load circuit the auxiliary or emergency oscillator in case of breakdown of the oscillator in actual service. Such prior art arrangement, however, presents the inconvenience of necessitating a certain delay to realize the commutation of the oscillators which may entrain a perturbation of the traffic.

(2) In another prior art system, oscillators are used comprising passive elements and active elements, the passive elements being common to the two oscillators whereas the active elements are distinct for each of the oscillators and are normally connected in parallel, these active elements being stabilized by feed-back arrangements in such a manner that the active elements of one oscillator can be disconnected in case of need from one of the oscillators without disturbing the functioning of the other oscillator. In this prior art system, however, placing the active elements in parallel involves certain practical difficulties, in particular for elements including transistors.

The present invention applies to transistorized installations in which the two oscillators include quartz crystals and are synchronized, the quartz crystals or analogous frequency determining means being disposed within thermostatically controlled enclosures or compartments.

The present invention has for its object a safety and alarm device for such installations, characterized by the fact that it includes a series of relays which permit the parallel connection of the oscillators only if the temperature of the thermostatically controlled enclosures is normal, if the levels of the output voltages of the oscillators are normal, and if the aforementioned output voltages are in phase. Additionally, when the two oscillators have been connected in parallel, the device according to the present invention causes the disconnection of one of the oscillators if the temperature of the thermostatically controlled enclosure or the level of the output voltage thereof ceases to be normal. The disconnection of an oscillator that operates abnormally brings about also the short-circuiting of the coupling transformer of the feedback circuit of the other oscillator in order not to disturb the functioning of the latter.

Further, the arrangement according to the present invention causes the setting off or triggering of a signal when the output voltages of the two oscillators cease to be in phase. This triggering set-off action may be regulated in such a manner as to be produced for a phase difference well less to that which risks the entrainment of de-synchronization of the oscillators. An operator thus advised may then act on the control of the oscillators in such a manner as to modify, in any suitable manner, the frequency of the output voltages thereof. In effect, the synchronization of the oscillators can be maintained only if the frequencies of the output voltages thereof differ between themselves only by a slight fraction of the nominal frequency thereof, not exceeding $2\times10^{-5}$ in an installation which has been realized in practice by the applicants of the present invention. For a larger deviation, the the oscillators would risk to become unsynchronized which would produce a beating between the output voltages thereof, and would bring about considerable variations and fluctuations in the level of the voltage applied to the utilization circuit.

Accordingly, it is an object of the present invention to provide a control system for a multi-oscillator installation which avoids the shortcomings and inadequacies of the prior art.

It is not object of the present invention to provide a safety and alarm system for an installation including two oscillators which assures a predetermined output voltage level as well as in-phase relationship between the two oscillators connected in parallel with the utilization circuit.

Still another object of the present invention resides in the provision of a control system for an installation provided with several oscillators connected in parallel with a utilization circuit which effectively prevents desynchronization of the oscillators and therewith frequency beating of the oscillators which in turn would produce voltage fluctuations in the utilization or load circuit.

Still another object of the present invention resides in the provision of two oscillators connected in parallel with the utilization circuit and provided with such control means including relays and thermostatically controlled oscillator circuits which assure a high degree of safety and regularity in the traffic in connection with multiple-path communications installations in which the oscillations produced are used as carrier frequencies.

A further object of the present invention resides in the provision of a safety control system for a multi-oscillator installation in which all oscillators are connected in parallel with the same utilization circuit and which effectively avoids any significant delays when switching from one oscillator to the other.

Another object of the present invention resides in a safety control arrangement for a multi-oscillator installation in which the oscillators are connected in parallel with the utilization circuit and which may be readily used with transistorized circuits.

Figure 2:
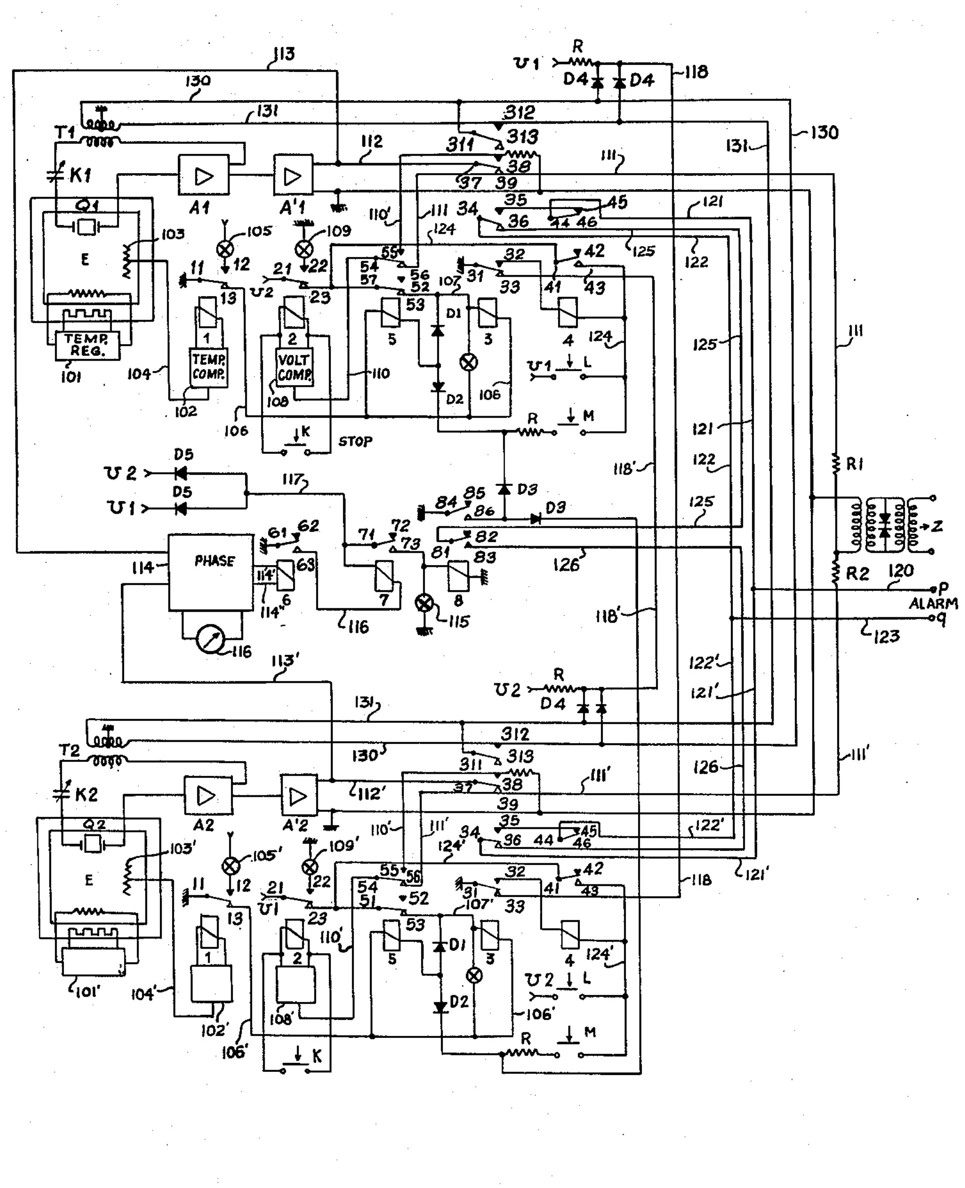

These and other objects, features and advantages of the present invention will become more obvious from the following description when taken in connection with the accompanying drawing which shows, for purposes of illustration only, one embodiment in accordance with the present invention, and wherein FIGURE 1 is a schematic diagram of an installation with two oscillators connected in parallel according to the present invention of which the synchronization is obtained by feedback circuits, and FIGURE 2 is a detailed schematic wiring diagram of such an installation provided with security and alarm means according to the present invention.

Referring now to the drawing wherein like reference numerals are used throughout the two views thereof to designate corresponding parts, and more particularly to FIGURE 1, each of the two oscillators of the installation of the present invention includes an amplifier or several stages of amplifiers $A_1$ and $A_2$ having a feedback circuit in which are connected, in series, a quartz crystal $Q_1$ and $Q_2$ and the primary winding of the coupling transformer $T_1$ and $T_2$, respectively. The secondary windings of these transformers $T_1$ and $T_2$ are connected directly with each other. An adjustable condenser $K_1$ and $K_2$, connected in series within the feedback circuit of a respective amplifier, enables the adjustment of the frequency of the current furnished by each oscillator, i.e., permits tuning of the oscillator as is well known.

To the output of the first amplifiers or amplifier stages $A_1$ and $A_2$ are connected, respectively, second amplifiers or amplifier stages $A'_1$ and and $A'_2$ of which the outputs are connected, by means of coupling resistances $R_1$ and $R_2$ to a common utilization network indicated only schematically by reference character Z and not shown in detail in the drawing.

Finally, a phase comparator designated by reference character P which may be of any suitable known construction and which comprises two inputs connected respectively to the outputs of the amplifiers $A'_1$ and $A'_2$, produces, by conventional means not illustrated in detail in FIGURE 1, the triggering of a signalization or alarm system when the phase difference between the output voltages of the two oscillators $A'_1$ and $A'_2$ attains a predetermined value.

The voltage-level comparator, which causes the disconnection of one of the oscillators if their output voltages cease to be equal, also is not illustrated in FIGURE 1.

Referring now to FIGURE 2, this figure illustrates a detailed schematic wiring diagram of an installation comprising a safety and alarm system according to the present invention. In connection with the description of FIGURE 2, the assembly of an oscillator and its associated devices will be referred to hereinafter as a "chain." Since each chain includes identical elements, similar reference numerals are used for corresponding parts of the two chains with primed reference numerals for the lower chain, and only one chain will be described hereinafter in detail as to the connection thereof. Those elements shown in FIGURE 1, however, will be designated in FIGURE 2 by corresponding reference characters.

The upper chain of the circuit illustrated in FIGURE 2 includes a hermetically-sealed enclosure E which is thermostatically controlled in any suitable manner and contains the quartz crystal $Q_1$. Associated with the thermostatically-controlled enclosure E is a temperature regulating system of any known conventional construction designated in FIGURE 1 by reference numeral 101 which maintains, in any suitable manner, a predetermined temperature or narrow range of temperatures within the enclosure E. Since the temperature regulating device 101 may be of any suitable construction, including a suitable heating element heated by electric current, as well as a thermostatically actuated control circuit, a detailed description thereof is dispensed with herein.

In this chain is also included a temperature comparator 102 which controls the relay 1 when the difference between the prevailing temperature of the thermostatically controlled enclosure E and the nominal predetermined temperature passes or exceeds a certain value. A temperature sensing device 103, for example, a so-called "thermistance," i.e., a resistor whose resistance is a function of the temperature is located within the enclosure and connected by means of circuit 104 with the temperature comparator 102. The latter may be of any suitable known construction, for example, a potentiometer circuit which includes the temperature responsive resistance 103 to provide the control effect de-energizing the relay 1 when the temperature difference between the prevailing temperature in enclosure E and a predetermined temperature exceeds a predetermined value and since the details thereof form no part of the present invention, a further description of the temperature comparator 102 is dispensed with herein. The normally energized "temperature" relay 1 is provided with a movable contact 11 engaging a stationary contact 13 when the relay 1 is energized while a circuit is established through the other stationary contact 12 if the relay 1 is de-energized. Upon de-energization of relay 1 which occurs when the temperature difference between the existing temperature within the enclosure E and the predetermined temperature exceeds a predetermined value, the signalling lamp 105 is energized over a circuit from ground, contacts 11–12 to one side of the power supply $U_2$, the other side thereof being grounded, whereby a visual warning signal is produced.

When relay 1 is energized, an energizing circuit is established from ground over contacts 11–13 of relay 1, through line 106, the energizing winding of relay 3, line 107, contacts 53–51, contacts 23–21 with one side of the power supply $U_2$, the other side of which is connected to ground, thereby energizing relay 3 which produces a control effect to be described more fully hereinafter.

A voltage level comparator 108 which may be of any known construction, for example, as disclosed in French Patent 1,256,655 of February 11, 1960, compares the voltage at the output of the chain with a predetermined reference voltage. As long as the output voltage is equal to or greater than a predetermined voltage, the relay 2 remains energized by the voltage comparator 108 thereby maintaining a circuit including contacts 21–23 the function of which will be described more fully hereinafter. However, an abnormal variation in the output voltage of the chain under consideration, due to a malfunction or disturbance, is indicated by the de-energization of relay 2 which causes closure of the warning circuit including the signalling lamp 109 and contacts 22–21 thereby producing a warning signal by energizing signalling lamp 109 and causing, by means of relay 3, a disconnection of the chain as will be described more fully hereinafter. The output voltage from amplifier $A'_1$ is applied to voltage comparator 108 through a circuit including line 110, contacts 54–55, line 110' and contacts 38–37 with relays 5 and 3 de-energized or through a circuit including line 110, contacts 54–56, line 111 and contacts 37–39 when relays 5 and 3 are energized.

Each chain additionally includes a relay 4 and a relay 5 as well as push buttons M, L and K of which the function will be described more fully hereinafter.

The output of the amplifier $A'_1$ which produces the carrier frequency oscillations is applied over line 112, contacts 37–39, with relay 3 energized, to line 111 leading from contact 39 in one direction, over the circuit described hereinabove, toward the voltage level comparator 108, and in the other direction to the primary winding of the output transformer through coupling resistance $R_1$. The output of the amplifier $A'_1$ is also applied through a branch line 113 to the phase comparator 114 which forms part of those elements common to both chains.

In addition to the phase comparator 114, the elements common to both chains include a relay 6, a relay 7, a relay 8, a signalling lamp 115 controlled by relay 7, and a meter 116. The phase comparator 114 which may be of any suitable known construction providing a direct current in the output thereof, includes an input circuit to which are applied, respectively, the output voltages taken off from the output of amplifiers $A'_1$ and $A'_2$ of each chain over lines 113 and 113'. The output circuit of the phase comparator produces in lines 114' and 114'' direct currents which annul one another when the voltages at the input terminals of the input circuit of the phase comparator are in phase. However, the differential current increases approximately proportionally to the phase difference between these input voltages up to a phase difference of $\pi/4$.

A slow variation of the frequency of the voltage of one or of both oscillators increases the phase difference between these voltages.

For a certain value of phase difference, the current in the output of the phase comparator 114 produces a signalization which indicates the necessity to regulate the frequency produced by one of the oscillators. This signalling is realized by energizing normally de-energized relay 6 which thereupon closes a circuit through the contacts 61–63, line 116, the energizing winding of relay 7 and line 117 leading to the power supplies $U_1$ and $U_2$ of the two chains, respectively through isolating rectifiers $D_5$. As a result thereof, relay 7 is energized which thereupon closes a circuit through contacts 71–73 and line 117 which energizes the signalling lamp 115 as well as relay 8. Upon energization of relay 8, circuits are established through contacts 81 and 83 and contacts 84 and 86 which produce certain control effects to be described more fully hereinafter.

The adjustment of the frequency of one or both oscillators, in case of a phase difference between the two oscillators, as described hereinabove, may be effected, as indicated hereinabove, by means of tunable condensers $K_1$ and $K_2$ (FIGURES 1 and 2). However, prior to proceeding with this control, one of the two chains is stopped by means of the "stop" push-button K which is depressed and which thereby short-circuits the energizing winding of relay 2 of the corresponding chain, whereupon the frequency of the voltage of the other chain is measured.

The feedback circuit including the quartz crystal $Q_1$ or $Q_2$, the condenser $K_1$ or $K_2$ and the transformer $T_1$ and $T_2$ are coupled to each other by means of the secondary windings of the transformers $T_1$ and $T_2$. More particularly, lines 130 and 131 leading from the secondary winding of transformer $T_1$ lead to the secondary winding of the transformer $T_2$ thereby effectively coupling together the feedback circuits of each of the oscillator chains.

As indicated hereinabove, in its normal "operating" position, i.e., when energized, relay 3 assures, by its contacts 37–39, the parallel connection of the oscillators with the utilization circuit Z over lines 111 and 111′ and coupling resistances $R_1$ and $R_2$, whereas, in its "rest" position, i.e., its de-energized condition, relay 3 causes, by closure of its contacts 311–312, the short-circuiting of the transformer $T_1$ or $T_2$, respectively.

Such short-circuiting is additionally assured by a circuit which comprises two diodes $D_4$ connecting the two outer terminals of the transformer $T_1$ or $T_2$ with the respective power supply $U_1$ or $U_2$ over lines 130 and 131 and through a resistor R, the center of the secondary winding of each transformer $T_1$ and $T_2$ being grounded.

When both chains are connected in parallel to the utilization circuit Z in the manner described hereinabove, a current flows through a circuit from ground, contacts 31–33 of relay 3 of one chain, line 118 or 118′, resistance R of the other chain and the power supply $U_1$ or $U_2$, also belonging to the other chain. As a result of this current flow producing a voltage drop in a respective resistance R, the diodes $D_4$ are subjected to a very low voltage and offer a high impedance thereby being analogous to an open circuit.

Opening of contacts 31–33 as a result of a defect of breakdown of one chain or its connection, causes the connection between ground and the resistance R of the opposite chain to be disconnected since relay 3 will be de-energized in that case and thereby opens the circuit including line 118 or 118′. As a result thereof, the current flowing through resistance R of the chain maintained in service flows across the diodes $D_4$ and the center point of the transformer $T_1$ or $T_2$ is thereby effectively connected to ground. Under these conditions, the impedances of the diodes $D_4$ of the chain in question are low for the current flowing therethrough in the normally passing or conducting direction of the diodes $D_4$, and may be assimilated to a short-circuit of the respective transformer $T_1$ or $T_2$.

As pointed out hereinabove, the energizing circuit for relay 3 passes from ground through contacts 11–13 of relay 1 controlled by the temperature comparator 102, line 106, the energizing winding of relay 3, line 107, contacts 51–53 of a start relay 5 and contacts 21–23 of relay 2 to power source $U_2$. Any de-energization of relays 1, 2 or 5 which causes the movable contact members 11, 21 or 51 thereof to fall back against the normal rest contact 12, 22 or 52 would open the energizing circuit of relay 3, and, therefore, would cause relay 3 to become de-energized so that its movable contact 31 would come into engagement with stationary contact 32, its movable contact 34 with stationary contact 35, its movable contact 37 with stationary contact 38, and its movable contact 311 with stationary contact 312.

It is assumed that the generators are each enclosed with a chassis adapted to be inserted into a structure such as a rack or frame which thereupon closes an interlock switch *pq* integral with this chassis. It is also assumed that the generators are disposed in a station which comprises an alarm circuit controlled by closure of the interlock switch *pq* which alarm circuit may be of any known construction including a bell, signalling lamp or the like.

Under these conditions, when the chassis of one generator is introduced into the rack, the contacts 44–45 of de-energized relay 4 and the contacts 34–35 of de-energized relay 3 of the generator under consideration short-circuit the contacts *p–q* over line 120 leading from terminal *p* to line 121 or line 121′, contacts 44–45 of de-energized relay 4, contacts 35–34 of de-energized relay 3, line 122 or line 122′ and line 123 leading to terminal *q*, and, consequently, cause closure of an alarm circuit which operates the signalling device advising the operating personnel of the existing operating conditions.

Next the push button L is actuated by depressing the same. Depressing the push button L of the upper chain closes a circuit from the power supply $U_1$ over line 124, the energizing winding of relay 4, and contacts 32–31 of de-energized relay 3, with ground, thereby energizing relay 4 which, upon energization thereof, opens the alarm circuit by opening circuit 121–125 when moving the movable contact 44 thereof into engagement with the stationary contact 46.

The prerequisite conditions for placing in parallel the two oscillators are as follows:

(1) The temperature of the thermostatically controlled enclosure E must be normal in which case the relay 1 is energized.

(2) The output voltage must be normal in which case the relay 2 is also energized as pointed out hereinabove, and (3) The oscillators must be in phase in which case the relay 8 remains de-energized as also pointed out hereinabove.

When all of these three conditions are simultaneously satisfied, the start button M may be depressed which causes the two oscillators to be connected in parallel.

When the relay 4 has been energized by depressing the push button L, as described hereinabove, a hold-circuit is established for relay 4 to maintain the same energized from ground, contacts 31–32 of de-energized relay 3, energizing winding of relay 4, contacts 43–41 of now energized relay 4, line 124, contacts 23–21 of energized relay 2 and power supply $U_2$. If now the push button M is depressed, the relay 5 will be energized over an energizing circuit including power supply $U_2$, contacts 21–23 of energized relay 2, line 124, contacts 41–43 of energized relay 4, line 124, push button M, resistance R, rectifier $D_2$ the energizing winding of relay 5, line 106 and contacts 13–11 of energized relay 1 to ground. After the relay M is released, the relay 5, however, remains energized through a hold circuit including contacts 21–23 of energized relay 2, contacts 51–53 of energized relay 5, rectifier $D_1$, the energizing winding of relay 5, line 106, and contacts 13–11 of relay 1. Upon energization of relay 5, relay 3 is also energized over the energizing circuit thereof including the power supply $U_2$, contacts 21–23 of energized relay 2, contacts 51–53 of energized relay 5, line 107, energizing winding of relay 3, line 106 and contacts 13–11 of energized relay 1 leading to ground. As a result thereof, the relay 3 is energized thereby moving the movable contact member 31 into engagement with the stationary contact 33 whereby the energizing circuit for relay 4 is opened and the latter becomes again de-energized.

The continuous current in the output of the phase comparator 114 controls a sensitive galvanometric relay 6 of any suitable construction. When the phase difference between the output voltages of the two oscillators exceeds a certain fixed limit, predetermined in advance, relay 6 is energized and the closure of contacts 61–63 of relay 6 causes energization of a relay 7 which is a low-power relay, i.e., a relay requiring and consuming little power for energization thereof. Energization of relay 7, in turn, energizes the signalling lamp 115 through contacts 71–73 and at the same time energizes relay 8 which by its energization closes contacts 81–83 and thereby gives the alarm. The alarm circuit may be traced from terminal *q*, line 123, line 122, contacts 34–36 of the now energized relay 3 of the upper chain, line 125, contacts 81–83 of the energized relay 8, line 126, contacts 36–34 of energized relay 3, of the opposite chain, line 121', line 120 and terminal *p*.

Additionally, energization of relay 8 effectively precludes the parallel connection of the two chains with the utilization circuit Z in the absence of phase coincidence of the two oscillators by connecting the left terminal of the start push button M with the ground through a circuit including contacts 84–86 of energized relay 8, one of the rectifiers $D_3$, and current limiting resistance R. In case relay 4 had been previously energized, this in effect would apply ground to both sides of the energizing winding of relay 4 thereby de-energizing the same. The application of ground through contacts 84–86 also precludes energization of the start relay 5 and therewith energization of the relay 3.

When the parallel connection of the two oscillators has been effected under normal operating conditions, but, in the course of operation, for instance, as a result of aging of the crystals, the phase difference between the two generators attains the value which causes the operation of the control system described hereinabove including the phase comparator 114, relay 6, relay 7 and relay 8, the galvanometric relay 6 closes its contact 61–63, relays 7 and 8 are again energized, the alarm is given as indicated hereinabove but notwithstanding the application of ground to relay 5 through contacts 84–86, diode $D_3$ and diode $D_2$, relay 5, once energized, no longer can become de-energized, for the energizing current thereof is applied to diode $D_2$ in the non-conductive direction thereof. Consequently, the oscillators remain in parallel.

The electric power sources for the various relays have been designated by reference numeral $U_1$ and $U_2$ in FIGURE 2. The safety of operation of the device described hereinabove may be increased by decoupling, among themselves, these two power sources $U_1$ and $U_2$ by means of diodes $D_5$.

While we have shown and described one preferred embodiment in accordance with the present invention, it is understood that the same is not limited thereto but is susceptible of many changes and modifications within the spirit and scope of the present invention, and we therefore do not wish to be limited to the details shown and described herein but intend to cover all such changes and modifications as are encompassed by the scope of the appended claims.

We claim:

1. A safety and control arrangement for placing a plurality of oscillators in parallel with a load circuit, comprising a plurality of oscillator means each including output circuit means and feedback circuit means, enclosure means for each oscillator means including temperature control means for maintaining a predetermined temperature therewithin and thereby maintaining a component of the respective oscillator means at a predetermined value for purposes of frequency stability, means operatively connecting said feedback circuit means with one another, and control means selectively connecting said output circuit means with said load circuit, said last-mentioned means including means preventing the parallel connection of said oscillator means in the absence of a predetermined temperature within said enclosure means, in the absence of a predetermined voltage level in the output circuit means of each oscillator means, and in the absence of an essential in-phase relationship between said oscillator means.

2. A safety and alarm system for an installation comprising two crystal controlled oscillators disposed thermostatically controlled enclosure means, said thermostatically controlled enclosure means being operable to maintain a component of a respective oscillator means at a predetermined value for purposes of frequency stability, said oscillators including feedback circuits, means operatively connecting said feedback circuits with one another, a load circuit, said oscillators including output circuits adapted to be connected in parallel with said load circuit, and means including relay means to enable the parallel connection of said output circuits with said load circuit only in the presence of the normal temperature value of the corresponding enclosure means and if the output voltage level of each oscillator has its normal value while the output voltages of the two oscillators are essentially in phase.

3. A safety and control arrangement for placing a plurality of oscillators in parallel with a load circuit, comprising a plurality of oscillator means each including output circuit means and feedback circuit means, enclosure means for each oscillator means including temperature control means for maintaining a predetermined temperature therewithin and thereby maintaining a component of the respective oscillator means at a predetermined value for purposes of frequency stability, means operatively connecting said feedback circuit means with one another, and control means selectively connecting said output circuit means with said load circuit, said last-mentioned means including means preventing the parallel connection of said oscillator means in the absence of a predetermined temperature within said enclosure means, in the absence of a predetermined voltage level in the output circuit means of each oscillator means, and in the absence of an essential in-phase relationship between said oscillator means, and means for disconnecting a respective oscillator means from said load circuit if the temperature of the corresponding enclosure means deviates from its normal value or if the output voltage level thereof deviates from its normal value.

4. A safety and control arrangement for placing a plurality of oscillators in parallel with a load circuit, comprising a plurality of oscillator means each including output circuit means and feedback circuit means, enclosure means for each oscillator means including temperature control means for maintaining a predetermined temperature therewithin and thereby maintaining a component of the respective oscillator means at a predetermined value for purposes of frequency stability, means operatively connecting said feedback circuit means with one another, and control means selectively connecting said output circuit means with said load circuit, said last-mentioned means including means preventing the parallel connection of said oscillator means in the absence of a predetermined temperature within said enclosure means, in the absence of a predetermined voltage level in the output circuit means of each oscillator means, and in the absence of an essential in-phase relationship between said oscillator means, means for setting off a signalling device in the absence of essential in-phase relationship between said oscillator means, and means for disconnecting a respective oscillator means from said load circuit if the temperature of the corresponding enclosure means deviates from its normal value or if the output voltage level thereof deviates from its normal value.

5. A safety and control arrangement for placing a plurality of oscillators in parallel with a load circuit, comprising a plurality of oscillator means each including output circuit means and feedback circuit means, enclosure means for each oscillator means including temperature control means for maintaining a predetermined temperature therewithin and thereby maintaining a component of the respective oscillator means at a predetermined value for purposes of frequency stability, means operatively connecting said feedback circuit means with one another, and control means selectively connecting said output circuit means with said load circuit, said last-mentioned means including means preventing the parallel connection of said oscillator means in the absence of a predetermined temperature within said enclosure means, in the absence of a predetermined voltage level in the output circuit means of each oscillator means, and in the absence of an essential in-phase relationship between said oscillator means and means for setting off a signalling device in the absence of essential in-phase relationship between said oscillator means.

6. A control arrangement for placing a plurality of oscillators in parallel with a utilization circuit, comprising a plurality of oscillator means each including output circuit means and feedback circuit means, enclosure means for each oscillator means including temperature control means for maintaining a predetermined temperature within said enclosure means and thereby maintaining a component of the respective oscillator means at a predetermined value for purposes of frequency stability, means operatively connecting said feedback circuit means with one another, manually operable means for connecting said oscillator means in parallel with said utilization circuit, and control means including disabling means for said manually operable means for preventing said parallel connection in the absence of a predetermined temperature within said enclosure means, in the absence of a predetermined voltage in the output circuit means of a respective oscillator means and in the absence of essential in-phase relationship between said oscillator means, and further control means for disconnecting a respective oscillator means from said utilization circuit if the output voltage level thereof deviates from a normal value or if the temperature within a respective enclosure means deviates from a normal value.

7. A control arrangement for placing a plurality of oscillators in parallel with a utilization circuit, comprising a plurality of oscillator means each including output circuit means and feedback circuit means, enclosure means for each oscillator means including temperature control means for maintaining a predetermined temperature within said enclosure means and thereby maintaining a component of the respective oscillator means at a predetermined value for purposes of frequency stability, means operatively connecting said feedback circuit means with one another, signalling means for signalling defective operation of at least one of said oscillator means, manually operable means for connecting said oscillator means in paarllel with said utilization circuit, and control means including disabling means for said manually operable means for preventing said parallel connection in the absence of a predetermined temperature within said enclosure means, in the absence of a predetermined voltage in the output circuit means of a respective oscillator means and in the absence of essential in-phase relationship between said oscillator means, and further control means for disconnecting a respective oscillator means from said utilization circuit if the output voltage level thereof deviates from a normal value or if the temperature within a respective enclosure means deviates from a normal value, said first mentioned control means being operative to set-off said signalling means in case said in-phase relationship ceases to exist without disabling the connection of the respective oscillator means with said utilization circuit.

8. A control arrangement for placing a plurality of oscillators in parallel with a utilization circuit, comprising a plurality of oscillator means each including output circuit means and feedback circuit means, enclosure means for each oscillator means including temperature control means for maintaining a predetermined temperature within said enclosure means and thereby maintaining a component of the respective oscillator means at a predetermined value for purposes of frequency stability, means operatively connecting said feedback circuit means with one another, signalling means for signalling defective operation of at least one of said oscillator means, manually operable means for connecting said oscillator means in parallel with said utilization circuit, and control means including disabling means for said manually operable means for preventing said parallel connection in the absence of a predetermined temperature within said enclosure means, in the absence of a predetermined voltage in the output circuit means of a respective oscillator means and in the absence of essential in-phase relationship between said oscillator means, said first mentioned control means being operative to set-off said signalling means in case said in-phase relationship ceases to exist without disabling the connection of the respective oscillator means with said utilization circuit.

References Cited in the file of this patent

FOREIGN PATENTS 615,180 Canada ---------------- Feb. 21, 1961